United States Patent
Byun et al.

(10) Patent No.: US 11,811,084 B2
(45) Date of Patent: Nov. 7, 2023

(54) DEGASSING SYSTEM OF POUCH FOR SECONDARY BATTERY

(71) Applicants: SK Innovation Co., Ltd., Seoul (KR); RS AUTO Co., Ltd., Chungcheongbuk-do (KR)

(72) Inventors: Jae Gyu Byun, Daejeon (KR); Dong Ju Kim, Daejeon (KR); Jin Go Kim, Daejeon (KR); Seung Noh Lee, Daejeon (KR); Taek Eon Jeong, Daejeon (KR); Deok Kun Kim, Chungcheongbuk-do (KR); Kang Min Lee, Chungcheongbuk-do (KR)

(73) Assignee: SK ON CO., LTD., Seoul (KR)

( * ) Notice: Subject to any disclaimer, the term of this patent is extended or adjusted under 35 U.S.C. 154(b) by 185 days.

(21) Appl. No.: 17/354,271

(22) Filed: Jun. 22, 2021

(65) Prior Publication Data

US 2021/0408635 A1    Dec. 30, 2021

(30) Foreign Application Priority Data

Jun. 26, 2020  (KR) .................. 10-2020-0078543

(51) Int. Cl.
*H01M 50/358*  (2021.01)
*H01M 50/105*  (2021.01)
*H01M 50/60*  (2021.01)
*H01M 10/04*  (2006.01)
*H01M 50/691*  (2021.01)
(Continued)

(52) U.S. Cl.
CPC ..... *H01M 50/358* (2021.01); *H01M 10/0404* (2013.01); *H01M 50/105* (2021.01); *H01M 50/60* (2021.01); *H01M 50/673* (2021.01); *H01M 50/691* (2021.01); *H01M 4/0447* (2013.01)

(58) Field of Classification Search
CPC .. H01M 50/358; H01M 50/105; H01M 50/30; H01M 10/04
See application file for complete search history.

(56) References Cited

U.S. PATENT DOCUMENTS 2,862,986 A * 12/1958 Strauss ................. H01M 10/34
                                                        429/50
5,645,953 A *  7/1997 Kim ...................... H01M 10/42
                                                        429/101

FOREIGN PATENT DOCUMENTS

CN      105552441 A      5/2016
EP        2648259 A2    10/2013
(Continued)

OTHER PUBLICATIONS

Machine Translation of: Bae et al. (KR 1020190074591), Jun. 28, 2019.*

(Continued)

*Primary Examiner* — Kenneth J Douyette
(74) *Attorney, Agent, or Firm* — IP & T GROUP LLP

(57) ABSTRACT

A degassing system of a pouch for a secondary battery is provided. In the degassing system, after inhaling gas regardless of the size of a cell pocket, the gas may be processed, and the convenience of work may be increased by setting the period of degassing time or the amount of gas to be discharged according to the size of a pouch, and an abnormality in a suction line for degassing may be automatically detected according to a comparison value by comparing the amount of discharged gas with a reference value preset by each pouch size.

9 Claims, 15 Drawing Sheets

(51) Int. Cl.
    *H01M 50/673*     (2021.01)
    *H01M 4/04*     (2006.01)

(56) References Cited

FOREIGN PATENT DOCUMENTS

| EP | 3474363 A1 | 4/2019 |
|----|---|---|
| KR | 10-2010-0118394 A | 11/2010 |
| KR | 10-2016-0084110 A | 7/2016 |
| KR | 10-2016-0102837 A | 8/2016 |
| KR | 10-21016-0118082 A | 10/2016 |
| KR | 10-2017-0104205 A | 9/2017 |
| KR | 10-1957503 B1 | 3/2019 |
| KR | 10-2019-0074591 A | 6/2019 |

OTHER PUBLICATIONS

Search Report issued by the European Patent Office dated Nov. 29, 2021.

\* cited by examiner

DEGASSING SYSTEM OF POUCH FOR SECONDARY BATTERY

CROSS-REFERENCE TO RELATED APPLICATION(S)

This application claims the benefit under 35 USC 119(a) of Korean Patent Application No. 10-2020-0078543 filed on Jun. 26, 2020 in the Korean Intellectual Property Office, the entire disclosure of which is incorporated herein by reference for all purposes.

BACKGROUND

1. Field

The present disclosure relates to a degassing system of a pouch for a secondary battery, and more particularly, to a degassing system of a pouch for a secondary battery, in which gas and other foreign substances present in a pouch may be completely removed in a process of manufacturing a pouch for a secondary battery, with a simplified structure.

2. Description of Related Art

In general, a secondary battery refers to a battery capable of being charged and discharged with electricity, unlike a primary battery that cannot be charged, and is widely used in electronic devices such as mobile phones, notebook computers, camcorders and the like, or in electric vehicles or the like.

In detail, lithium-ion secondary batteries have higher capacity than nickel-cadmium batteries or nickel-hydrogen batteries, which are often used as power sources for electronic equipment, and the usage of lithium-ion secondary batteries is rapidly increasing due to high energy density per unit weight.

Lithium-ion secondary batteries mainly use lithium-based oxides and carbon materials as a positive electrode active material and a negative electrode active material, respectively.

A lithium-ion secondary battery includes an electrode assembly in which a positive electrode plate and a negative electrode plate to which a positive electrode active material and a negative electrode active material are applied, respectively, are disposed with a separation unit therebetween, and an exterior material sealing and accommodating the electrode assembly together with an electrolyte solution, for example, a battery case 133.

The lithium-ion secondary battery may be classified as a can-type secondary battery in which an electrode assembly is embedded in a metal may and a pouch-type secondary battery in which an electrode assembly is embedded in a pouch of an aluminum laminate sheet, depending on the shape of the exterior material.

In manufacturing a pouch-type secondary battery, an electrode assembly including a negative electrode, a separation unit, and a positive electrode is inserted into an exterior-material pouch, and an electrolyte is injected, and then, the edge is sealed. Then, the battery is activated through several charge/discharge cycles.

In this process, gas may be generated inside of the cell. In this case, in order to collect the generated gas, a size of the pouch exterior material of the pouch-type secondary battery is larger than the final product before the activation process.

In the pouch exterior material, a portion formed to be larger than a portion in which the electrode assembly is disposed is referred to as a gas pocket portion, and gas generated during the activation process may be collected in the gas pocket portion.

After the activation process is completed, a hole is formed in the gas pocket portion to drain the gas, and then the gas pocket is cut and the pouch exterior material is resealed according to the final product standard.

On the other hand, when gas exceeding the allowable expansion range of the gas pocket portion is generated during the activation process, the insulation of the sealing portion may be destroyed.

However, since the amount of gas generated during the activation process may vary depending on the material of the electrode assembly and activation conditions, it is not easy to determine the appropriate size of the gas pocket portion.

Accordingly, in the related art, the size of the gas pocket portion is formed to be as large as possible to prevent the insulation of the sealing portion from being destroyed during the activation process.

However, since the gas pocket portion is an unnecessary part to be cut out after the degassing process, manufacturing in a relatively large size is significantly inefficient in terms of production costs.

PRIOR ART LITERATURE

Patent Literature (Patent Document 1) Korean Patent Application Publication No. 10-2010-0118394

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a degassing system of a pouch for a secondary battery, capable of processing gas after suctioning gas regardless of the size of a cell pocket.

An aspect of the present disclosure is to provide a degassing system of a pouch for a secondary battery, in which the convenience of work may be increased by setting the time for degassing or the amount of gas to be discharged according to the size of a pouch, and an abnormality in a suction line for degassing may be automatically detected according to a comparison value by comparing the amount of discharged gas with a reference value preset by each pouch size.

An aspect of the present disclosure is to provide a degassing system of a pouch for a secondary battery in which quality may be guaranteed while lowering the unit cost of a product, with a simplified configuration.

According to an exemplary embodiment, a degassing system of a pouch for a secondary battery includes a separation unit including an adsorption plate for adsorbing at least one surface of the pouch, and a degassing adsorption plate being disposed inside the adsorption plate and adsorbing the pouch inside of the adsorption plate, the degassing adsorption plate including a guide hole through which a needle is configured to be drawn in and out, the separation unit forming a space inside the pouch by pulling the adsorption plate through suction operation of a suction passage; a gas discharge unit discharging gas inside the pouch through a gas discharge path formed in the needle when the needle pierce the pouch; and a foreign substance removing unit removing a discharge mixed with gas respectively flowing into the suction passage and the gas discharge path, the adsorption plate and the degassing adsorption plate providing adsorption force required for pouch adsorption.

The foreign substance removing unit may include a first suction line connected to the suction passage, a first suction pump configured to provide adsorption force required for pouch adsorption to the separation unit while suctioning a discharge mixed with gas through the first suction line by a suction operation, a second suction line connected to the gas discharge path, and a second suction pump suctioning a discharge mixed with gas through the second suction line by a suction operation.

The degassing system may further include a filter respectively connected to the first suction line and the second suction line, and filtering the discharges mixed with gas.

The degassing system may further include a first vacuum pressure sensor sensing pressure in the first suction line, a solenoid valve connected to the first suction line and configured to open or close the first suction line according to presence or absence of detection of the first vacuum pressure sensor, a second vacuum pressure sensor sensing pressure in the second suction line, and a precision control valve connected to the second suction line and configured to open or close the second suction line according to presence or absence of detection of the second vacuum pressure sensor.

The degassing system may further include a first kitz valve connected to a first solenoid valve by the first suction line, and a second kitz valve connected to the solenoid valve by the second suction line.

The degassing system may further include a first pressure control valve adjusting an opening range of the first suction line such that a suction force of the first suction pump acting on the first suction line is changed, depending on a size of the pouch, and a second pressure control valve adjusting an opening range of the second suction line such that a suction force of the second suction pump acting on the second suction line is changed, depending on the size of the pouch.

The degassing system may further include a first residual pressure removing unit removing residual pressure present in the first suction line after completing the removal of the discharge mixed with gas from the inside of the separation unit. The first residual pressure removing unit may include a first air regulator supplying air to the first connection line.

The degassing system may further include a second residual pressure removing unit removing residual pressure present in the second suction line after completing the removal of the discharge mixed with gas from the gas discharge path. The second residual pressure removing unit may include a second air regulator supplying air to the second connection line.

The degassing system may further include a control unit in which a period of degassing time through the second suction line or a gas discharge amount is set according to a size of the pouch, and a sensor unit transmitting measurement results of an amount of gas discharged from the second suction line to the control unit. The control unit may compare the gas discharge amount measured by the sensor unit with a reference value predefined for respective sizes of the pouch, and may detect an abnormality in the second suction line according to a comparison value.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
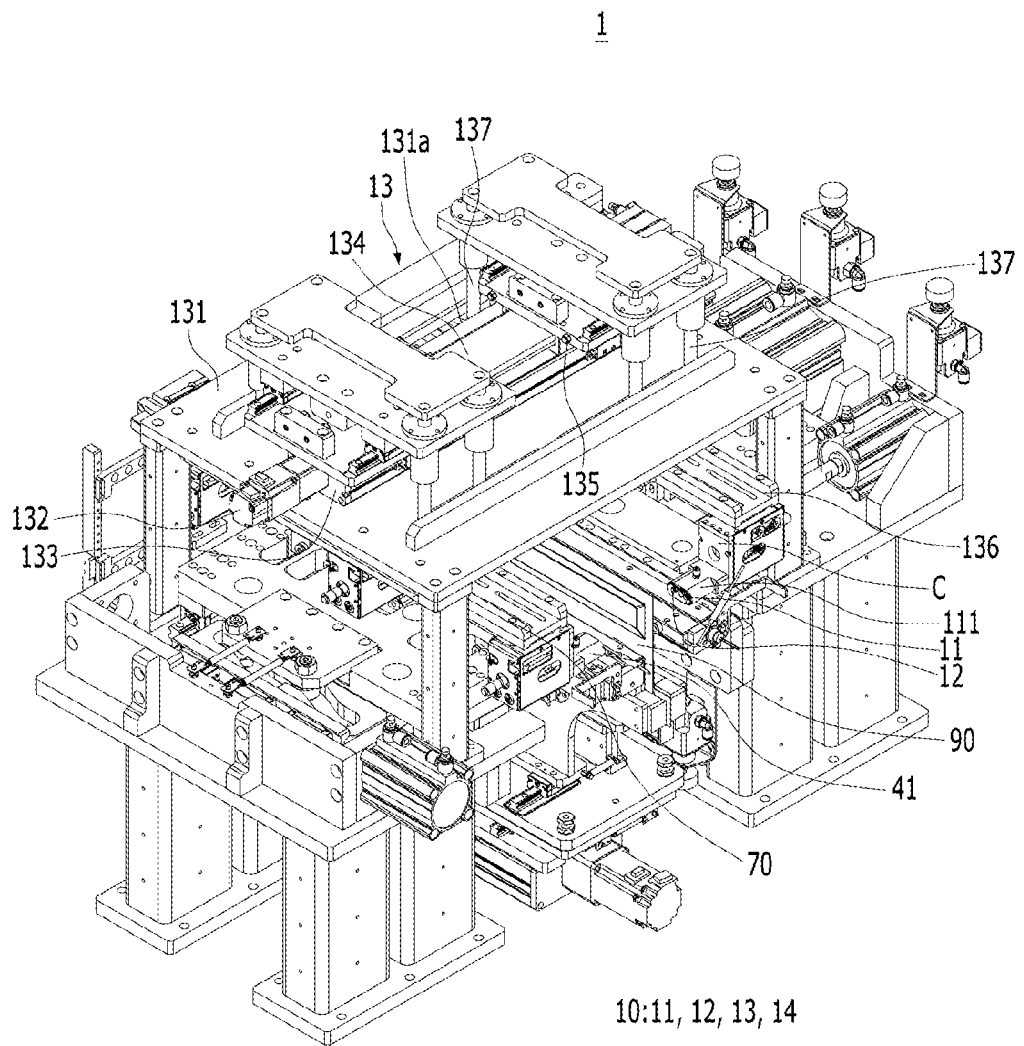
FIGS. 1 and 2 are perspective views illustrating a degassing system of a pouch for a secondary battery according to an exemplary embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Figure 2:
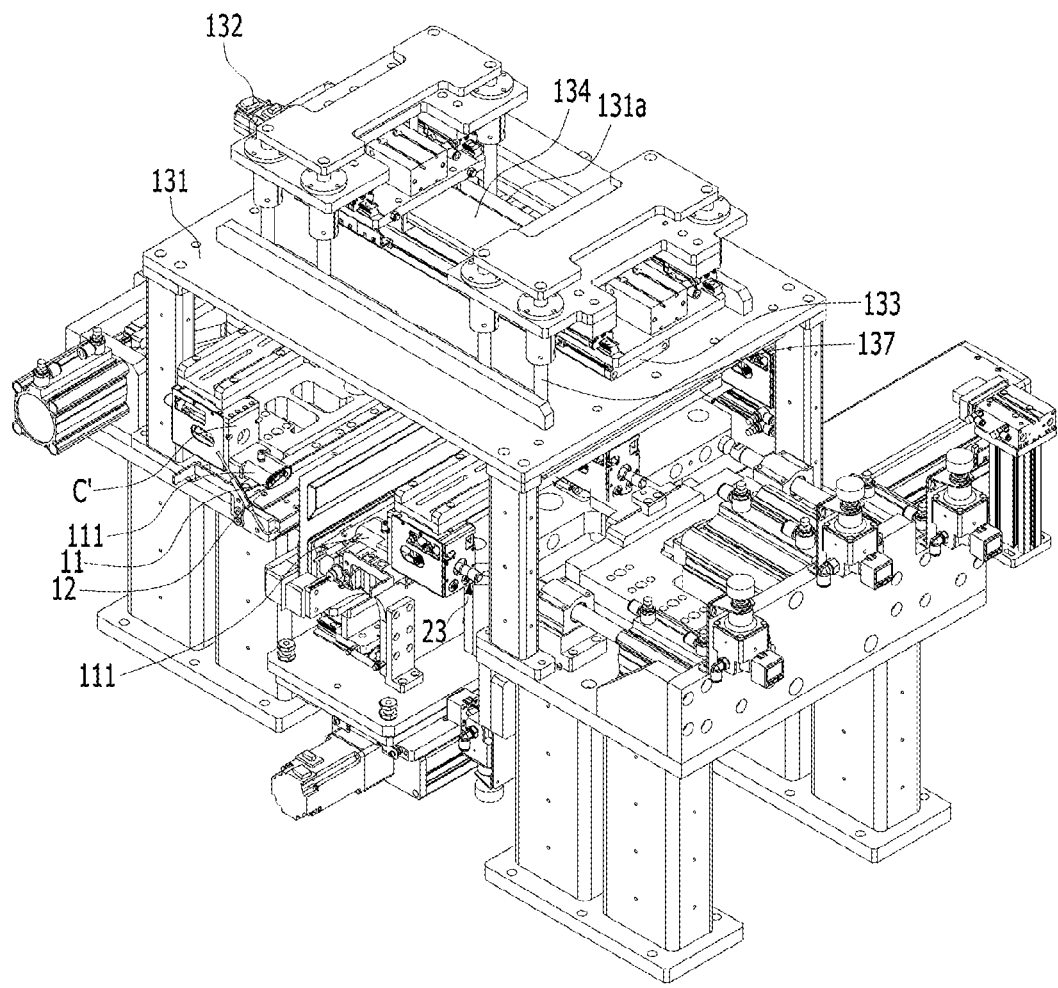
Figure 3:
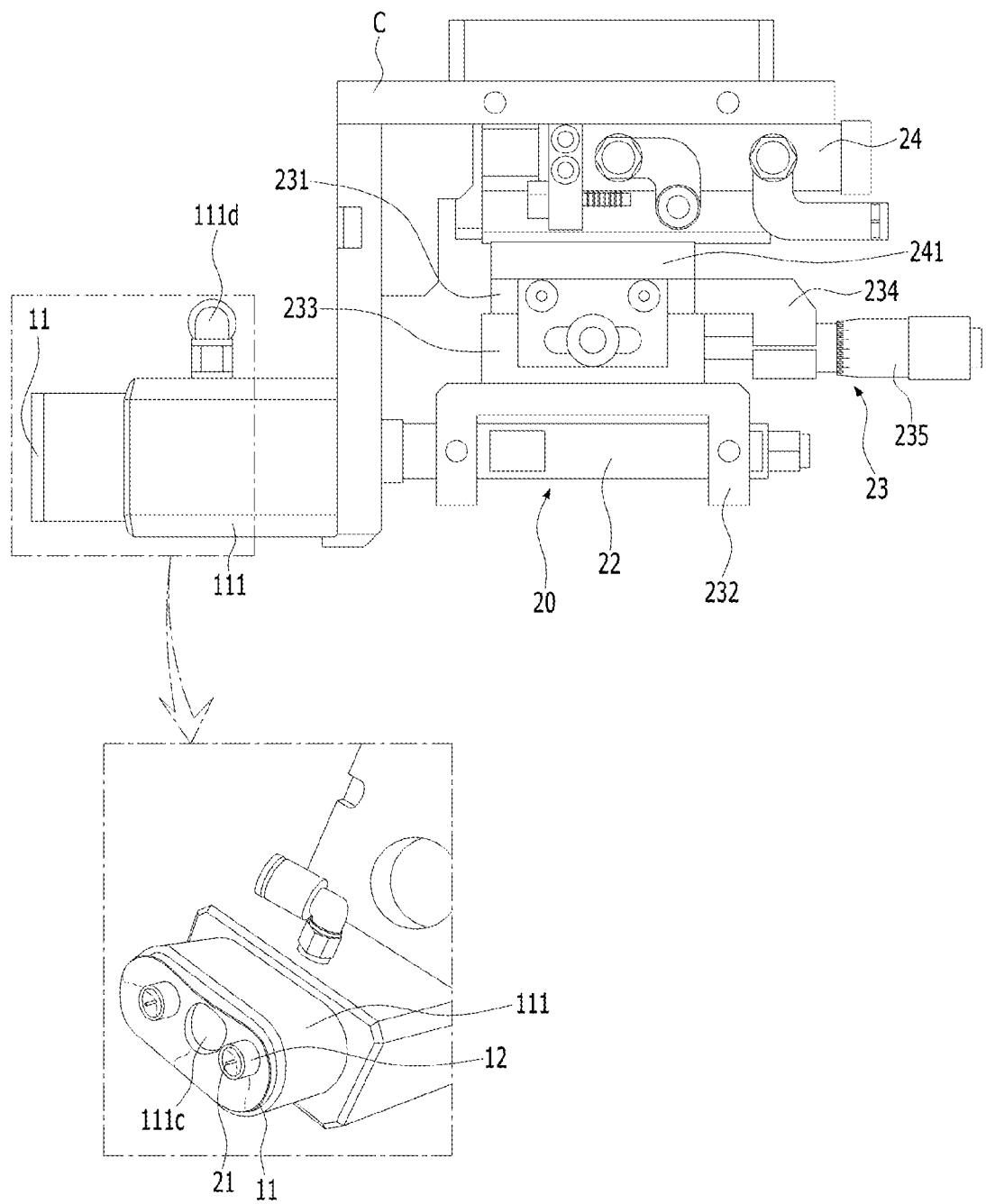
FIG. 3 is a perspective view illustrating a separation unit and a gas discharge unit applied to a degassing system of a pouch for a secondary battery according to an exemplary embodiment of the present disclosure.
Figure 4:
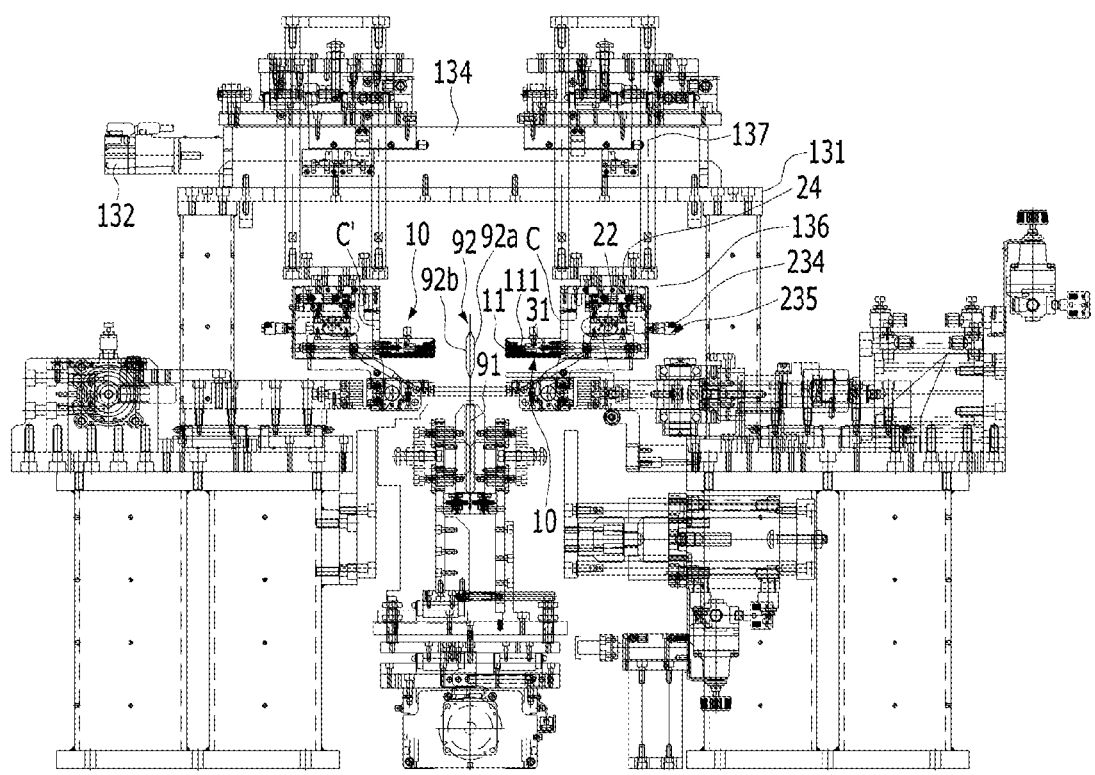
FIG. 4 is a front view illustrating a use state of the separation unit and the gas discharge unit applied to a degassing system of a pouch for a secondary battery according to an exemplary embodiment of the present disclosure.
Figure 5:
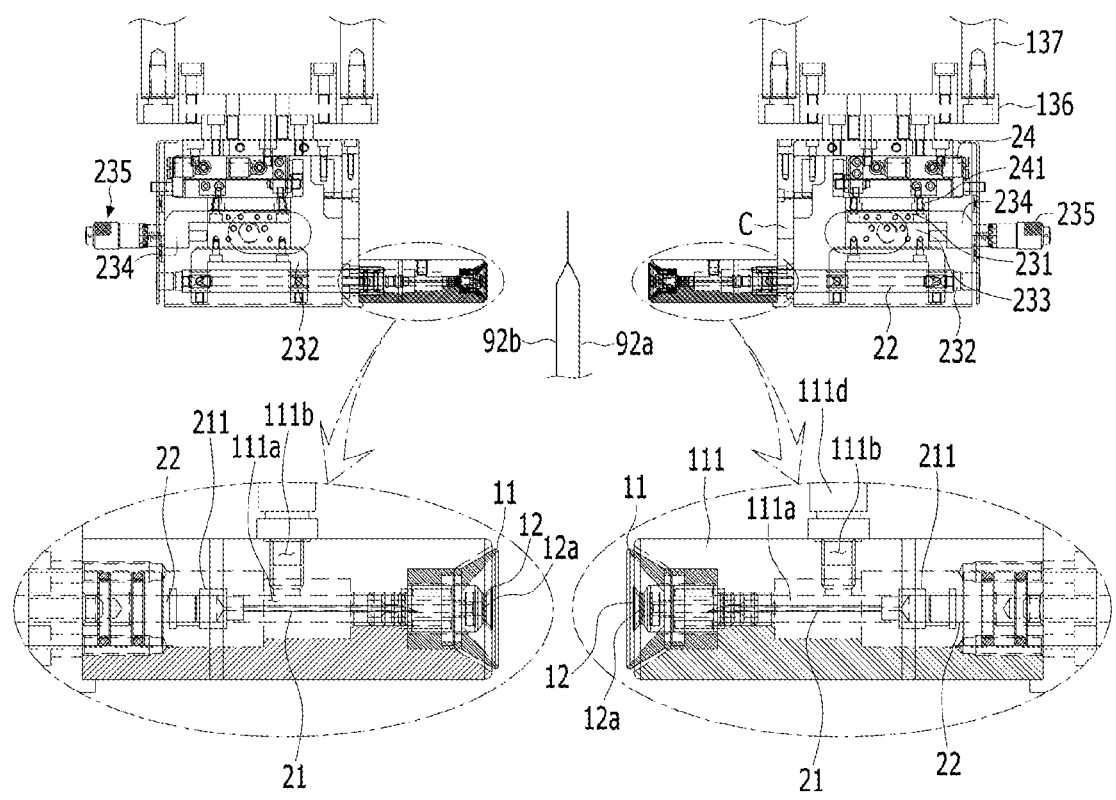
FIG. 5 is an enlarged cross-sectional view of the separation unit and the gas discharge unit applied to a degassing system of a pouch for a secondary battery according to an exemplary embodiment of the present disclosure.
Figure 6:
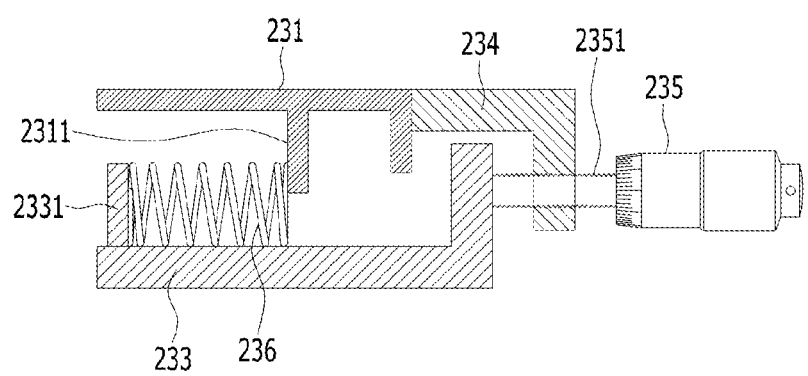
FIG. 6 is a cross-sectional view illustrating an adjusting unit applied to a degassing system of a pouch for a secondary battery according to an exemplary embodiment of the present disclosure.
Figure 13:
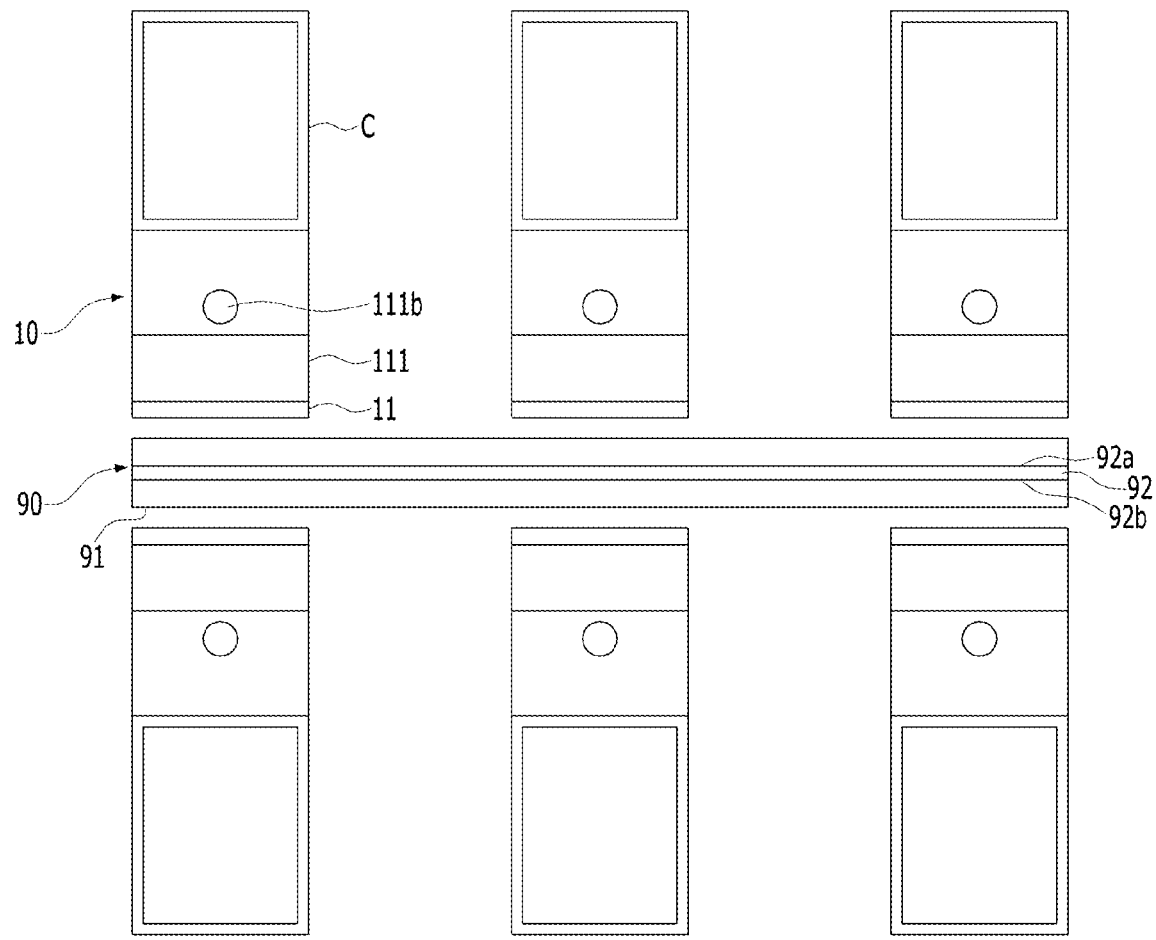
FIG. 13 is a plan view illustrating an arrangement state of a degassing system of a pouch for a secondary battery according to an exemplary embodiment of the present disclosure, with respect to a pouch.
Figure 14:
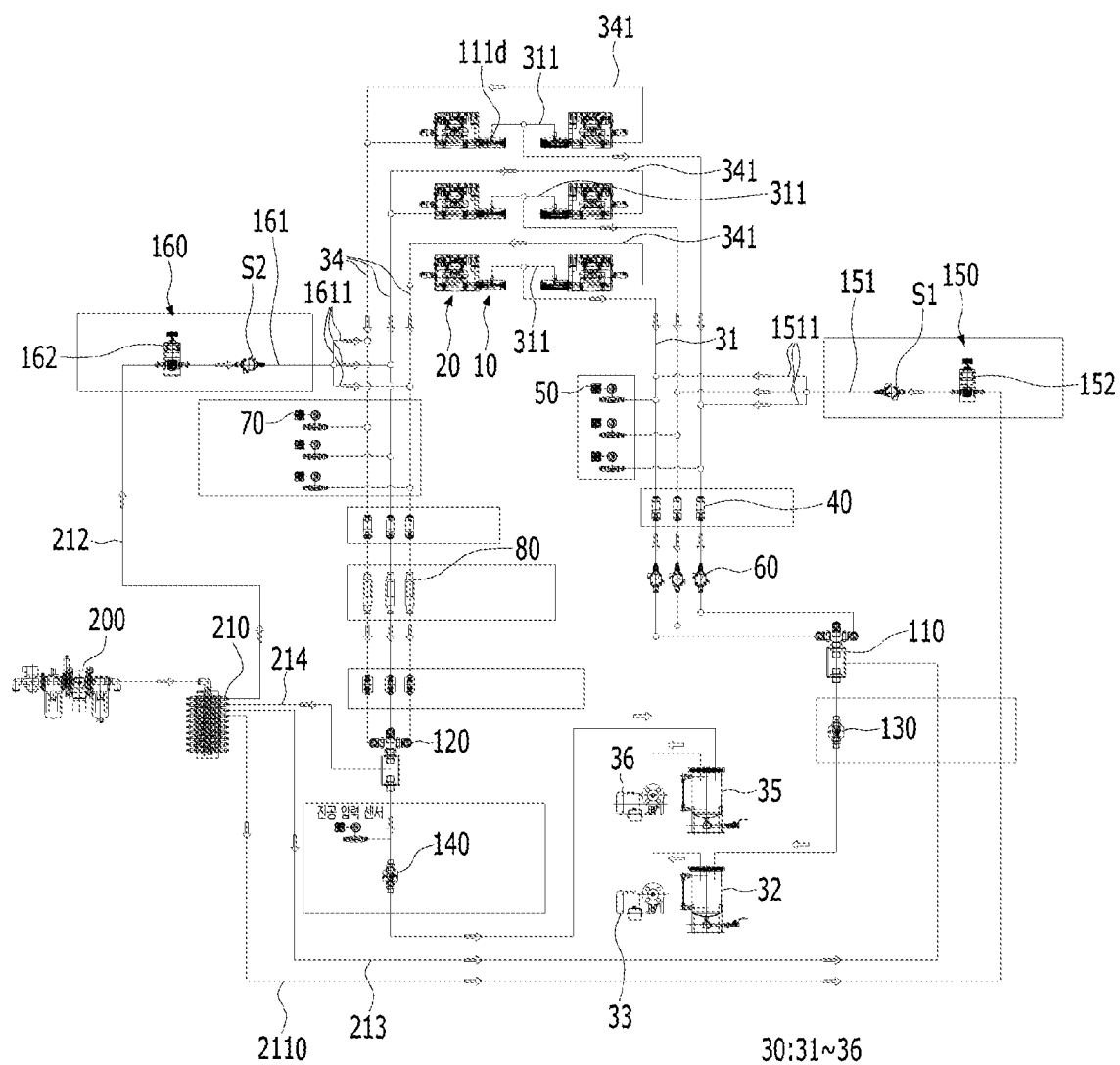
FIG. 14 is a diagram illustrating a connection state of a separation unit, a gas discharge unit, and a foreign substance removing unit applied to a degassing system of a pouch for a secondary battery according to an exemplary embodiment of the present disclosure.
Figure 15:
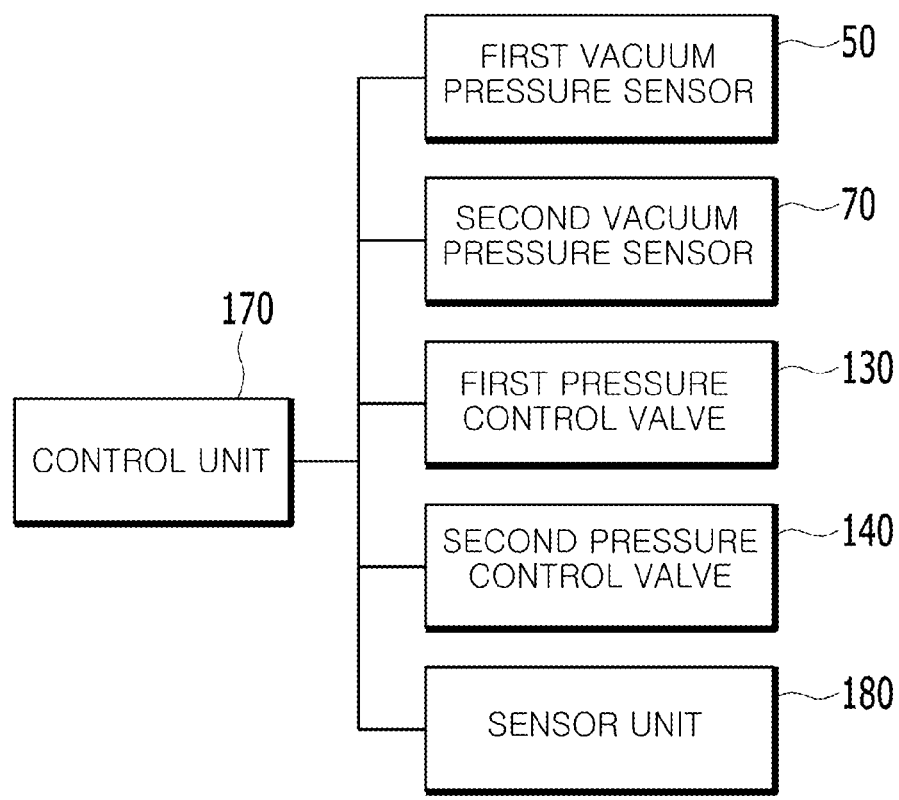
FIG. 15 is a block diagram illustrating a connection relationship between components applied to a pouch for a secondary battery according to an exemplary embodiment of the present disclosure, with respect to a pouch.

FIGS. 1 and 2 are perspective views illustrating a degassing system of a pouch for a secondary battery according to an exemplary embodiment of the present disclosure. FIG. 3 is a perspective view illustrating a separation unit and a gas discharge unit applied to a degassing system of a pouch for a secondary battery according to an exemplary embodiment of the present disclosure. FIG. 4 is a front view illustrating a use state of the separation unit and the gas discharge unit applied to a degassing system of a pouch for a secondary battery according to an exemplary embodiment of the present disclosure, FIG. 5 is an enlarged cross-sectional view of the separation unit and the gas discharge unit applied to a degassing system of a pouch for a secondary battery according to an exemplary embodiment of the present disclosure. FIG. 6 is a cross-sectional view illustrating an adjusting unit applied to a degassing system of a pouch for a secondary battery according to an exemplary embodiment of the present disclosure, and FIGS. 7 to 12 are diagrams illustrating a step-by-step process of removing gas inside of a cell pocket through a degassing system of a pouch for a secondary battery according to an exemplary embodiment of the present disclosure. FIG. 13 is a plan view illustrating an arrangement state of a degassing system of a pouch for a secondary battery according to an exemplary embodiment of the present disclosure, with respect to a pouch, and FIG. 14 is a diagram illustrating a connection state of a separation unit, a gas discharge unit, and a foreign substance removing unit applied to a degassing system of a pouch for a secondary battery according to an exemplary embodiment of the present disclosure. FIG. 15 is a block diagram illustrating a connection relationship between components applied to a pouch for a secondary battery according to an exemplary embodiment of the present disclosure, with respect to a pouch.

A degassing system 1 of a pouch for a secondary battery according to an exemplary embodiment of the present disclosure is a product capable of suctioning and removing gas and other foreign substances present inside of a pouch 90 in a process of manufacturing a pouch for a secondary battery (hereinafter referred to as a 'pouch').

Furthermore, the degassing system 1 may be used semipermanently by discharging gas and foreign substances flowing into the product.

In this case, the pouch 90 may largely include a cell body 91 and a cell pocket 92.

The cell body 91 and the cell pocket 92 may be integrally formed by sealing edges of a first surface 92a and a second surface 92b formed of the same material and size.

The cell body 91 accommodates an electrode assembly and an electrolyte therein, and the cell pocket 92 is used for removing gas existing inside of the cell body 91.

The degassing system of the pouch for a secondary battery according to an exemplary embodiment of the present disclosure may include the separation unit 10 separating the first surface 92a and the second surface 92b of the cell pocket 92, a gas discharge unit 20 removing gas present in the inner space of the cell pocket 92, and a foreign substance removing unit 30 respectively removing a mixed discharge (dust, electrolyte) that is mixed with the gas jointly entering the separation unit 10 and a gas discharge path by the operation of the gas discharge unit 20.

In this case, the separation unit 10 provided with the gas discharge part 20 installed thereon may be applied in one or in plural according to the size of the pouch 90. The drawing illustrates an example in which the separation unit 10 provided with the gas discharge unit 20 installed thereon is provided in three on each of the first surface 92a and the second surface 92b of the pouch 90, and in this state, the gas inside of the cell pocket 92 is removed.

Further, the separation units 10 provided with the gas discharge unit 20 may be disposed to be positioned on the horizontal line with each other on the first surface 92*a* and the second surface 92*b*. In addition, the separation units 10, which are provided with the gas discharge unit 20 and which are disposed on the first surface 92*a* and the second surface 92*b* respectively, may face each other with a cell pocket therebetween.

In this case, the number of applications of the separation unit 10 provided with the gas discharge unit 20 installed thereon is not limited to three, and may be selectively reduced or added according to the size of the pouch 90.

The separation unit 10 is to separate the first surface 92*a* and the second surface 92*b* so that the gas discharge unit 20 to be described later may suck the gas present in the cell pocket 92, and may include at least one of a body 111, an adsorption plate 11, a degassing adsorption plate 12, a lower adsorption plate 14, and a forward and reverse driving unit 13.

In this case, the number of applications of the separation unit 10 may be increased or decreased depending on the size of the pouch 90.

The body 111 may be formed to have a polygonal block shape having a predetermined thickness and area.

In the inside of the body 111, an insertion hole 111*a* into which a needle 21 and a gas discharge pipe 22, which are part of the gas discharge unit 20 to be described later, are jointly inserted, is formed.

Inside of the body 111, a center hole 111*c* disposed in the insertion hole 111*a*, and a suction passage 111*b* which is connected to the foreign substance removing unit 30 to be described later and is connected to the center hole 111*c* may be formed.

In this case, the insertion hole 111*a* is formed in the horizontal length direction of the body 111, and the suction passage 111*b* is formed in a direction perpendicular to the upper surface of the body 111 and is connected to the insertion hole 111*a*.

The insertion hole 111*a* may be formed in plural, and the needle 21 and the gas discharge pipe 22 may each be applied in the same number as the insertion holes 111*a*.

In addition, the end of the center hole 111*c* is exposed to the front surface of the separation unit 10 and faces the first surface 92*a* or the second surface 92*b* of the pouch 90.

The center hole 111*c* enables the suction force of the gas discharge unit 20 to be described later to act on the first surface 92*a* or the second surface 92*b* of the pouch 90 such that the adsorption plate 11 may adsorb the first surface 92*a* or the second surface 92*b* of the pouch 90.

In addition, a suction nozzle 111*d* provided with a first branch line 311 to be described later installed thereon may be installed on the suction passage 111*b*.

In this case, the number of applications of the insertion hole 111*a*, the needle 21, and the gas discharge pipe 22 may be changed, depending on various conditions such as the size of the pouch 90 and the like in case of increasing the gas removal rate.

The adsorption plate 11 is formed in front of the body 111 to separate the first surface 92*a* from the second surface 92*b* by interaction with the forward and reverse driving unit 13 to be described later.

The adsorption plate 11 may be formed in an elliptical ring shape be adsorbed to a relatively large area of the first surface 92*a*, and may be formed along the front edge of the body 111.

The degassing adsorption plate 12 is respectively adsorbed to the first surface 92*a* and the second surface 92*b* together with the adsorption plate 11, while being fixed to the adsorption plate 11.

The degassing adsorption plate 12 is applied in two, the same as that of the needle 21.

A guide hole 12*a* through which the needle 21 is drawn in and out is formed in the inside of the degassing adsorption plate 12.

In this case, a connection hole for allowing the needle 21 to move to the degassing adsorption plate 12 is formed on the front end of the adsorption plate 11 to be positioned on the same line as the guide hole 12*a* and the insertion hole 111*a*.

The degassing adsorption plate 12 may be formed to have an approximately circular ring shape to have excellent adsorption power to the first surface 92*a*, and the diameter thereof may be formed in a form gradually smaller from one end facing the first surface 92*a* to the other end contacting the adsorption plate 11.

The space between the inside of the adsorption plate 11 and the outside of the degassing adsorption plate 12 and the pouch 90, as described above, is formed in a watertight structure to form a vacuum state, such that the gas removal unit 20 to be described later may completely remove gas inside of the cell pocket 92.

The lower adsorption plate 14 is applied such that the first surface 92*a* and the second surface 92*b* of the cell pocket 92 are spaced apart more widely and stably.

The lower adsorption plate 14 is comprised of a pair of lower adsorption plates to face each other with the cell pocket 92 interposed therebetween.

The lower adsorption plate 14 may be formed in the same shape as the adsorption plate 11.

For example, one lower adsorption plate 14 faces the first surface 92*a*, and the other lower adsorption plate 14 faces the second surface 92*b*.

In addition, the lower adsorption plate 14 may be disposed at a lower position than the main body 111.

The lower adsorption plate 14 includes a lower body 111, moved forwards or in reverse with respect to the first surface 92*a* and the second surface 92*b*, respectively, through a separate driving source.

In this case, although not illustrated in the drawings, the driving source may be formed of a cylinder or a cam, or may be formed of the same product as the forward and reverse driving unit 13 to be described later.

The driving source is operated at the same time as the forward and reverse driving unit 13 to be described later.

For example, when the forward and reverse driving unit 13 advances the adsorption plate 11 and the degassing adsorption plate 12, the driving source advances the lower adsorption plate 14 to be adsorbed onto the second surface 92*b*, and when the forward and reverse driving unit 13 moves the adsorption plate 11 and the degassing adsorption plate 12 backward, the driving source moves the lower adsorption plate 14 backward such that the first surface 92*a* and the second surface 92*b* are separated from each other.

Subsequently, the lower adsorption plate 14 is formed on one end of the lower body 111 and is positioned on a substantially vertical line with the adsorption plate 11 and the degassing adsorption plate 12.

Accordingly, the lower adsorption plate 14 is adsorbed on the first surface 92*a* together with the adsorption plate 11 when moving forwards, and when moving in reverse, pulls the first surface 92*a* together with the adsorption plate 11 to be spaced apart from the second surface 92*b*.

At this time, the lower adsorption plate 14 separates the lower portion of the first surface 92*a* rather than the adsorption plate 11, thereby forming a kind of barrier on the cell pocket 92. Due to the barrier formed by the lower adsorption plate 14, in the process of suctioning and discharging the gas present in the inner space of the cell pocket 92 through the needle 21, the electrolyte in the cell body 91 may be prevented from rising to the inner space of the cell pocket 92 and being inhaled by the needle 21.

In this case, the lower adsorption plates 14 are disposed to face each other with the cell pocket 92 interposed therebetween, and pull the first surface 92a and the second surface 92b, respectively, to form a wider space in the cell pocket 92.

On the other hand, the above-described main body 111 may be installed in front of a coupler (C) formed in an approximately '¬'-shaped cross-sectional shape.

The coupler (C) serves as a medium connecting the main body 111 and the forward and reverse driving unit 13.

A connection hole (not illustrated) is formed in the coupler C in a position corresponding to the insertion hole 111a of the main body 111.

The forward and reverse driving unit 13 may include an upper plate 131 moving the adsorption plate 11 and the degassing adsorption plate 12 forward and backward, disposed to be spaced apart from the upper side of the coupler C by a predetermined distance, and provided with rectangular movement guide holes 131a formed on both sides, respectively, a motor 132 installed on the upper surface of the upper plate 131, a case 133 installed on the upper surface of the upper plate 131, a guide rail 134 disposed on the upper side of the case 133, a rotating shaft (not illustrated) accommodated in the case 133, rotated in the forward or reverse direction by the power of the motor 132, and provided with left and right-hand threads that are formed on the left and right sides thereof, respectively, based on the central portion, a slide portion 135 that moves in both directions along the guide rail 134 on the upper surface of the case 133, a mounting ring (not illustrated) formed on the lower side of the slide portion 135, mounted on the outer periphery of the rotating shaft inside of the case 133, and provided with a screw thread that may move in both directions along the right-hand thread of the rotating shaft on the inner periphery thereof, a connection block 136 fixed to the upper surface of the couplers (C), and a connection shaft 137 connecting both sides of the slide portion 135 and the connection block 136, and moving forwards or in reverse on the movement guide hole 131a.

At this time, in an exemplary embodiment of the present disclosure, when the motor 132 rotates the rotating shaft in the forward direction, the mounting ring may advance along the right-hand thread and gradually move toward the central portion of the rotating shaft, and when the motor 132 rotates the rotating shaft in the reverse direction, the mounting ring may move backwards along the right thread and gradually move toward the right side of the rotating shaft.

For example, when the mounting ring is advanced, the slide portion 135, the connection block 136, the connection shaft 137, the coupler (C) and the separation unit 10 are uniformly advanced so that the adsorption plate 11 and the degassing adsorption plate 12 are adsorbed on the first surface 92a. In such a state, when the mounting ring is moved in reverse, the slide portion 135, the connection block 136, the connection shaft 137, the coupler (C) and the separation unit 10 are uniformly retracted, and as a result, the adsorption plate 11 and the degassing adsorption plate 12 pull the first surface 92a to be separated from the second surface 92b.

On the other hand, the gas discharge unit 20 removes gas from the inner space of the cell pocket 92 in which the first surface 92a and the second surface 92b are spaced apart by the separation unit 10 as described above, and may include at least one of the needle 21, the gas discharge pipe 22, an adjusting unit 23, and a needle driving unit 24.

The needle 21 is provided as a pair of two needles, which are inserted into the insertion holes 111a of the main body 111, respectively.

The needles 21 may be parallel to each other, and may respectively move forwards or in reverse through the insertion hole 111a and the guide hole 12a.

A gas discharge path for discharging the gas in the cell pocket 92 is formed in the needle 21 in the longitudinal direction.

A part of the gas discharge pipe 22 is inserted into the insertion hole 111a of the main body 111 by penetrating through the connection hole of the coupler C, and the other part protrudes to the outside of the coupler C.

In addition, a mounting pipe 211 provided on the end of the needle 21 is mounted on the outer periphery of the end of the gas discharge pipe 22.

The internal space of the gas discharge pipe 22 and the gas discharge path of the needle 21 are connected to each other.

An adjusting unit 23 is applied to a portion of the gas discharge pipe 22, which protrudes to the outside of the main body 111, to vary the withdrawal length of the needle 21 drawn out of the degassing adsorption plate 12.

The adjusting unit 23 may include at least one of a guide part 231, a bracket 232, a moving part 233, an adjusting guide part 234, a variable control unit 235, and a spring 236, as illustrated in FIG. 6.

The guide part 231 is coupled to a piston 241 of the needle driving unit 24. Accordingly, the guide part 231 may be advanced or reversed with respect to the first surface 92a.

The guide part 231 may be formed in a polygonal box shape having an open bottom surface and an empty space formed therein, and may be provided with a first support plate 2311 formed in an inner space thereof and supporting the spring 236.

The bracket 232 is formed to have an approximately '⊏' cross-sectional shape, and through-holes (not illustrated) through which the gas discharge pipe 22 is installed are formed in the front and rear sides.

The moving part 233 is connected to the guide part 231 and fixed to the bracket 232.

The moving part 233 may be formed in a polygonal box shape with an open upper surface and an empty space formed therein, and in the inner space thereof, a second support plate 2331 is formed to support the spring 236 in a position spaced apart from the first support plate 2311, in the inner space.

The moving part 233 may be movably connected to the guide part 231.

As an example, a rail groove (not illustrated) formed in an approximately 'T' cross-sectional shape is formed in one of lower surface both sides of the guide part 231 and upper surface both sides of the moving part 233, and in the other one, a slide portion 135 formed in an approximately 'T' cross-sectional shape is formed, such that the moving part 233 may move forwards or in reverse in a sliding manner in the guide part 231.

The adjusting guide part 234 is coupled to the outer surface of the guide part 231 and may be formed in an approximately '¬'-shaped cross-sectional shape.

A variable guide hole is formed in a surface of the adjusting guide part 234 facing the moving part 233.

The variable control unit 235 advances the moving part 233 and includes a push portion 2351 that penetrates through the variable guide hole and contacts the moving part 233.

In this case, threads that mesh with each other are formed on the inner circumference of the variable guide hole and the outer circumference of the push portion 2351.

Therefore, when the variable control unit 235 is rotated in the forward direction, the push portion 2351 moves forward along the variable guide hole and pushes the moving part 233 to advance the moving part 233, and as a result, the gas discharge pipe 22 connected by the bracket 232 and the needle 21 mounted on the gas discharge pipe 22 are advanced.

In addition, when the variable control unit 235 is rotated in the reverse direction, the push portion 2351 is moved in reverse along the variable guide hole to be spaced apart from the moving part 233.

On the circumferential surface of the variable control unit 235, a scale for numerically displaying the length of the needle 21 to be drawn out or drawn in and a number corresponding to the scale may be printed.

The spring 236 performs a function of returning the moving part 233 to an original position thereof when the push portion 2351 is spaced apart from the moving part 233, and is accommodated jointly in the inner space of the moving part 233 together with the guide part 231, and both sides thereof are fixed to a first support plate 2311 and a second support plate 2331, respectively.

Accordingly, when the moving part 233 is moved forward by rotating the variable control unit 235 in a forward direction, the first support plate 2311 and the second support plate 2331 are separated from each other, and thus, the spring 236 is expanded, and when the variable control unit 235 is rotated in the reverse direction, the spring 236 is contracted to an original shape and thus, the moving part 233 moves in reverse.

The more the moving part 233 is advanced, the longer the withdrawal length of the needle 21 with respect to the degassing adsorption plate 12 is, and as the moving part 233 is moved in reverse, the withdrawal length of the needle 21 with respect to the degassing adsorption plate 12 decreases. Therefore, the withdrawal length of the needle 21 may be adjusted by controlling the variable control unit 235 according to the thickness of the first surface 92*a*.

The needle driving unit 24 is driven to move the needle 21 to the inside or outside of the cell pocket 92, and may be formed of a rodless cylinder or a hydraulic cylinder. In the drawings, an example in which the need driving unit 24 is formed of a rodless cylinder is illustrated.

The needle driving unit 24 has an upper surface fixed to the ceiling surface of the coupler C, and the piston 241 is coupled to the upper surface of a fixing block.

The piston 241 reciprocates in both directions in the longitudinal direction of the needle driving unit 24 to uniformly advance or reverse the gas discharge pipe 22 and the needle 21 with respect to the first surface 92*a*.

At this time, when the needle 21 is advanced, the front side thereof is withdrawn from the degassing adsorption plate 12 and then penetrates the first surface 92*a* and is positioned in the inner space of the cell pocket 92.

On the other hand, the foreign substance removing unit 30 provides a suction force required for degassing to the suction passage 111*b* and the gas discharge passage, respectively, and provides a suction force required for vacuum of the pouch 90.

In this case, when the foreign substance removing unit 30 generates a suction force, not only the gas in the pouch 90 but also the discharged material, for example, the electrolyte is suctioned in a predetermined amount.

Accordingly, the foreign substance removing unit 30 is configured to also remove the electrolyte that is unintentionally suctioned together with the gas.

To this end, the foreign substance removing unit 30 may include a first suction line 31 removing gas and electrolyte suctioned into the separation unit 10, a first trap tank 32, a first suction pump 33, a second suction line 34 removing gas and electrolyte suctioned into the gas discharge path, a second trap tank 35, and a second suction pump 36.

The first suction line 31 has a tubular structure and has a passage therein through which the gas-mixed discharged material is conveyed.

The first suction line 31 is applied in a total of three, and includes two first branch lines 311 respectively connected to the suction nozzles 111*d* installed in the suction passages 111*b* of both separation units 10 facing the first surface 92*a* and the second surface 92*b*, respectively, thereby suctioning gas or electrolyte leaking through between the degassing absorption plate 12 and the first surface 92*a* or between the degassing absorption plate 12 and the second surface 92*b*.

The first trap tank 32 is connected to the first suction line 31 to store gas or electrolyte.

The first suction pump 33 is connected to the first trap tank 32 and sucks gas or electrolyte stored in the first trap tank 32 through a suction operation and discharges the gas or electrolyte externally or provides the gas or electrolyte to a separate treatment tank (not illustrated).

A filter for filtering gas or electrolyte may be provided inside of the treatment tank.

In addition, the suction force of the first suction pump 33 acts jointly on the first suction line 31, the suction hole, and the center hole 111*c*.

For example, the adsorption plate 11 is adsorbed on the first surface 92*a* or the second surface 92*b* by the suction power of the first suction pump 33, and by the suction power of the first suction pump 33, gas or electrolyte leaking out between the degassing absorption plate 12 and the first surface 92*a* or between the degassing absorption plate 12 and the second surface 92*b* passes through the center hole 111*c*, the suction hole, the first suction line 31, and the first trap tank 32 sequentially, and is suctioned by the first suction pump 33.

The second suction line 34 has a tubular structure, and has a passage therein for conveying the discharged material mixed with gas.

The second suction line 34 is applied in a total of three, and each includes two second branch lines 341 connected to the gas discharge pipes 22 disposed on the first surface 92*a* and the second surface 92*b*, respectively, to suck gas or electrolyte in the gas discharge path.

The second trap tank 35 is connected to the second suction line 34 to store gas or electrolyte.

The second suction pump 36 is connected to the second trap tank 35 and sucks the gas or electrolyte stored in the second trap tank 35 through a suction operation and discharges the gas or electrolyte externally or provides the gas or electrolyte to a separate treatment tank (not illustrated).

A filter for filtering gas or electrolyte may be provided inside of the treatment tank.

The suction force of the second suction pump 36 acts jointly on the second suction line 34, the gas discharge pipe 22, and the gas discharge path.

For example, the degassing adsorption plate 12 is adsorbed on the first surface 92*a* or the second surface 92*b* by the suction power of the second suction pump 36, and due to the suction power of the second suction pump 36, the gas or electrolyte introduced into the gas discharge path is suctioned into the second suction pump 36 by passing through the gas discharge pipe 22, the second suction line 34, and the second trap tank 35 in sequence.

Additionally, the degassing system of a pouch for a secondary battery according to an exemplary embodiment of the present disclosure may further include a first vacuum pressure sensor 50, a solenoid valve 60, a first Kitz valve 110, a first pressure control valve 130, and a second vacuum pressure sensor 70, a second Kitz valve 120, a second pressure control valve 140, a control unit 170, and a sensor unit 180.

As the first vacuum pressure sensor 50, a total of three first vacuum pressure sensors 50 are applied to respectively sense the passage pressure of the first suction line 31.

As the solenoid valve 60, a total of three solenoid valves 60 are applied and are respectively installed on the first suction line 31.

Accordingly, the solenoid valves 60 may respectively open or close the passage of the first suction line 31.

In this case, a vacuum filter 40 may be further installed on the first suction line 31.

The vacuum filter 40 filters the electrolyte transferred through the passage of the first suction line 31 to prevent the electrolyte or fumes from flowing into the solenoid valve 60, thereby preventing the lifespan of the solenoid valve 60 from being reduced.

In the process of degassing the pouch 90, the first vacuum pressure sensor 50 senses the pressure in each passage of the first suction line 31 in real time, and transmits the sensed information to the control unit 170 to be described later.

The control unit 170 stores a reference pressure value of the passage of the first suction line 31.

Therefore, the pressure of the passage is lowered due to the introduction of the electrolyte into one or more first suction lines 31, and when the pressure value of the passage of the first suction line 31 and the reference pressure value of the passage are different, the control unit 170 enables the solenoid valve 60 installed on the suction line 31 to operate to close the passage.

Further, the control unit 170 may be configured to display the first suction line 31 into which the electrolyte has been introduced on the operator monitor and to notify the operator by sounding a buzzer installed in the degassing system.

The first Kitz valve 110 may be applied in one, and is jointly connected to the three first suction lines 31.

The first Kitz valve 110 may be connected to the solenoid valve 60 by the first suction line 31.

Therefore, when the pouch 90 is to be degassed, the first Kitz valve 110 and the solenoid valve 60 may be opened, and when the degassing operation of the pouch 90 is completed, the first Kitz valve 110 and the solenoid valve 60 may be closed.

The first pressure control valve 130 is installed on the first suction line 31 and may be disposed between the first Kitz valve 110 and the first trap tank 32.

The first pressure control valve 130 controls the main pressure required for vacuum of the pouch 90.

To this end, the first pressure control valve 130 may be formed as a ball valve, and the operation thereof is controlled by the control unit 170.

In detail, the first pressure control valve 130 may adjust the opening range of the passage of the first suction line 31 depending on the size of the pouch 90.

For example, the suction force of the first suction pump 33 acting on the passage of the first suction line 31 is varied depending on the opening range of the first pressure control valve 130. For example, when the length of the pouch 90 in the horizontal direction is 300 mm and the length in the vertical direction is 260 mm, the control unit 170 controls the first pressure control valve 130 to generate the suction pressure of the first suction pump 33 with respect to the passage of the first suction line 31 in about 80 kPa.

In this case, the first vacuum pressure sensor 50 senses whether a suction pressure of 80 kPa is continuously applied to the passage of the first suction line 31, and when the passage pressure of the first suction line 31 is less than or exceeds 80 kPa, the control unit 170 may operate the buzzer while displaying the pressure state on a user monitor.

By adjusting the suction pressure acting on the passage of the first suction line 31 as described above, the amount of electrolyte discharged from the pouch 90 during the degassing process may be significantly reduced, and degassing may be safely performed within the appropriate time.

Therefore, information on respective sizes of the pouch 90 is stored in the control unit 170 in advance, and the ideal suction pressure value corresponding to each size is stored in advance. Whenever the size of the pouch 90 is changed, the size of the pouch 90 is input to the control unit 170, such that the pressure control valve 130 may be opened within the opening range of the first pressure control valve 130 corresponding to the size of the pouch 90.

In this case, the size of the pouch 90 and the suction pressure acting on the passage of the first suction line 31 accordingly are not limited to the description above, and may be set by the operator such that a most ideal suction pressure may act according to the size of the pouch 90.

As the second vacuum pressure sensor 70, a total of three second vacuum pressure sensors 70 are applied to respectively sense the passage pressure of the second suction line 34.

In this case, a vacuum filter 40 may be further installed on the second suction line 34, to filter the electrolyte to prevent the electrolyte or fumes from flowing into a precision control valve 80 respectively installed on the second suction line 34.

In the process of degassing the pouch 90, the second vacuum pressure sensor 70 senses the pressure in each passage of the second suction line 34 in real time and transmits the sensed pressure state to the control unit 170 described above.

The control unit 170 also stores a reference pressure value of the passage of the second suction line 34 therein.

Therefore, when an electrolyte is introduced into one or more second suction lines 34 and the pressure of the passage is lowered, and when the pressure value of the passage of the second suction line 34 and the reference pressure value of the passage are different, the control unit 170 enables the precision control valve 80 installed on the second suction line 34 to operate to close the passage.

Further, the control unit 170 may be configured to display the second suction line 34 into which the electrolyte has been introduced on the operator monitor, and to notify the operator by ringing a buzzer installed in the degassing system.

As the second Kitz valve 120, one second Kitz valve 120 may be applied, and is jointly connected to the three second suction lines 34.

In addition, the second Kitz valve 120 may be connected to the precision control valve 80 by the second suction line 34.

Therefore, when the pouch 90 is to be degassed, the second Kitz valve 120 and the precision control valve 80 may be opened, and when the degassing operation of the pouch 90 is completed, the second Kitz valve 120 and the precision control valve 80 may be closed.

The second pressure control valve 140 is installed on the second suction line 34 and may be disposed between the second Kitz valve 120 and the second trap tank 35.

The second pressure control valve 140 controls the main pressure required for vacuum of the pouch 90.

To this end, the second pressure control valve 140 may be formed as a ball valve, and the operation thereof is controlled by the control unit 170 described above.

In detail, the second pressure control valve 140 may adjust the opening range of the passage of the second suction line 34 according to the size of the pouch 90.

For example, the suction force of the first suction pump 33 acting on the passage of the second suction line 34 is varied depending on the opening range of the second pressure control valve 140. For example, when the length of the pouch 90 in the horizontal direction is 300 mm and the length in the vertical direction is 260 mm, the control unit 170 controls the second pressure control valve 140 such that the suction pressure of the second suction pump 36 with respect to the passage of the second suction line 34 is generated in about 80 kPa.

In this case, the second vacuum pressure sensor 70 senses whether the suction pressure of 80 kPa continuously acts on the passage of the second suction line 34, and when the passage pressure of the second suction line 34 is less than or exceeds 80 kPa, the control unit 170 operates the buzzer while displaying the pressure state on the user monitor.

By adjusting the suction pressure acting on the passage of the second suction line 34 as described above, the amount of electrolyte discharged from the pouch 90 during the degassing process may be significantly reduced, and degassing may be safely performed within a relatively most ideal time.

Therefore, the size information of the pouch 90 is stored in advance by each size in the control unit 170, and the ideal suction pressure value corresponding to each size is stored in advance. Therefore, the size of the pouch 90 is input to the control unit 170 whenever the size of the pouch 90 is changed, and the opening range of the second pressure control valve 140 may correspond to the size of the pouch 90 so that the second pressure control 140 may be opened within the opening range.

In this case, the size of the pouch 90 and the suction pressure acting on the passage of the second suction line 34 accordingly are not limited to the descriptions above, and may be set by the operator such that a most ideal suction pressure may be applied according to the size of the pouch 90.

On the other hand, in the above-described control unit 170, the degassing time according to the size of the pouch 90 or the amount of gas to be discharged from the second suction line 34 in units of a predetermined time are set.

As the sensor unit 180, a total of three sensor units 180 are applied and are installed on the second suction lines 34, respectively.

The sensor unit 180 may be disposed between the vacuum filter 40 and the precision control valve 80 respectively installed on the second suction line 34.

In this case, the precision control valve 80 may be applied as a ball valve.

The sensor unit 180 may be formed as a vacuum flow sensor such that the amount of gas to be discharged through the second suction line 34 may be inspected in real time during the process of degassing the pouch 90.

The sensor unit 180 measures the amount of gas to be discharged from the second suction line 34 in response to a control signal from the control unit 170 and then transmits the information of the measured gas amount to the control unit 170.

The control unit 170 controls the operation of the sensor unit 180 according to a preset time, compares the amount of gas discharge measured by the sensor unit 180 with a reference value predefined for each size of the pouch 90, and detects whether or not the second suction line 34 is abnormal according to the comparison value.

For example, the electrolyte together with the gas is cured on the passage of the second suction line 34 to block the passage, and thus, the amount of gas to be discharged for a predetermined period of time is reduced.

In this case, the control unit 170 displays the second suction line 34 in which an abnormality has occurred on the operator monitor, and sounds a buzzer installed in the degassing system to notify the operator.

Additionally, the control unit 170 may be configured to control the operation of the second suction pump 36 described above.

For example, since the period of degassing time according to the size of the pouch 90 or the amount of discharged gas is set in the control unit 170, the suction pressure generated by the second suction pump 36 and the operation time of the second suction pump 36 may be set and controlled according to the size of the pouch 90 to be degassed.

On the other hand, the degassing system of a pouch for a secondary battery according to an exemplary embodiment of the present disclosure may further include a first residual pressure removing unit 150 removing the residual pressure existing in the first suction line 31 after completing the removal of the gas-mixed discharge from the inside of the separation unit 10, and a second residual pressure removing unit 160 removing the residual pressure existing in the second suction line 34 after completing the removal of the gas-mixed discharge from the inside of the gas discharge path.

The first residual pressure removing unit 150 may include a first connection line 151 and a first air regulator 152.

The first connection line 151 includes three first branch lines 1511 respectively connected to the first suction line 31, and is connected to the first air regulator 152.

On the first connection line 151, a solenoid valve S1, which closes the passage of the first suction line 31 only during the degassing process to prevent air of the first air regulator 152 from flowing into the first suction line 31, may be installed.

The first air regulator 152 is connected to a first supply line 2110 of an air supply solenoid-valve manifold 210. In addition, the air supply solenoid valve manifold 210 is connected to a main air regulator 200.

Therefore, the air discharged from the main air regulator 200 sequentially passes through the air supply solenoid-valve manifold 210, the first supply line 2110, the first air regulator 152, and the first connection line 151, and is then supplied to the first suction line 31 to remove residual pressure existing in the passage of the first suction line 31.

The second residual pressure removing unit 160 may include a second connection line 161 and a second air regulator 162.

The second connection line 161 includes three second branch lines 1611 respectively connected to the second suction line 34, and is connected to the second air regulator 162.

The second connection line 161 may be provided with a solenoid valve S2 installed thereon, closing the passage of the second suction line 34 only during the degassing process to prevent air from flowing into the second suction line 34.

The second air regulator 162 is connected to a second supply line 212 of an air supply solenoid valve manifold 210. In addition, the air supply solenoid valve manifold 210 is connected to the above-described main air regulator 200.

Accordingly, the air discharged from the main air regulator 200 sequentially passes through the air supply solenoid valve manifold 210, the second supply line 212, the second air regulator 162, and the second connection line 161, and is then supplied to the second suction line 34 to remove residual pressure existing in the passage of the second suction line 34.

Additionally, the air supply solenoid valve manifold 210 is connected to the first Kitz valve 110 through a third supply line 213, and is connected to the second Kitz valve 120 through a fourth supply line 214.

Therefore, when the air supply solenoid valve manifold 210 supplies air to the first suction line 31 and the second suction line 34, the air supply solenoid valve manifold 210 also supplies the air to the first Kitz valve 110 and the second Kitz valve 120 to remove the residual pressure existing in the first Kitz valve 110 and the second Kitz valve 120.

Next, a gas removal method using a degassing system of a pouch for a secondary battery according to an exemplary embodiment of the present disclosure will be described with reference to FIGS. 7 to 11.

In a method of degassing a pouch for a secondary battery according to an exemplary embodiment of the present disclosure, first (a) the adsorption plate 11 is adsorbed to the first surface 92a and the second surface 92b, respectively.

In detail, the adsorption plate 11 is advanced by the forward and reverse driving unit 13 to adsorb the first surface 92a and the second surface 92b, respectively.

The degassing adsorption plate 12 disposed inside of the adsorption plate 11 and the lower adsorption plate 14 disposed below the adsorption plate 11 are also advanced together with the adsorption plate 11 to adsorb the first surface 92a and the second surface, respectively.

In this case, the adsorption plate 11 and the degassing adsorption plate 12 are disposed to face each other with the cell pocket 92 interposed therebetween to support each other, thereby stably adsorbing the first surface 92a and the second surface 92b.

Figure 7:
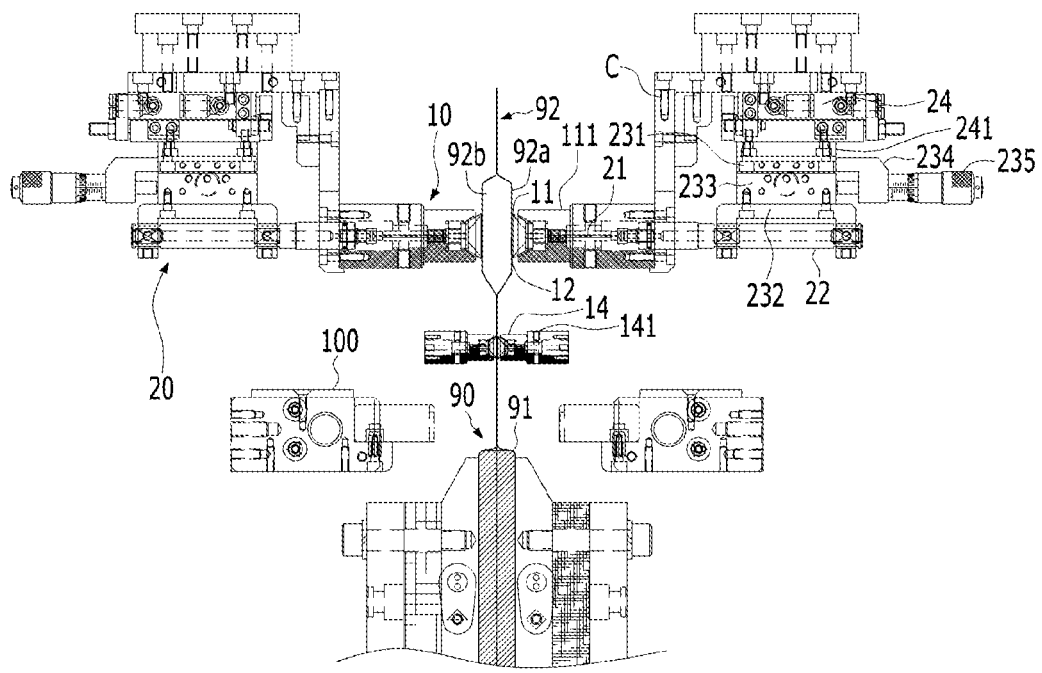
FIGS. 7 to 12 are diagrams illustrating a step-by-step process of removing gas inside of a cell pocket through a degassing system of a pouch for a secondary battery according to an exemplary embodiment of the present disclosure.
Figure 7:
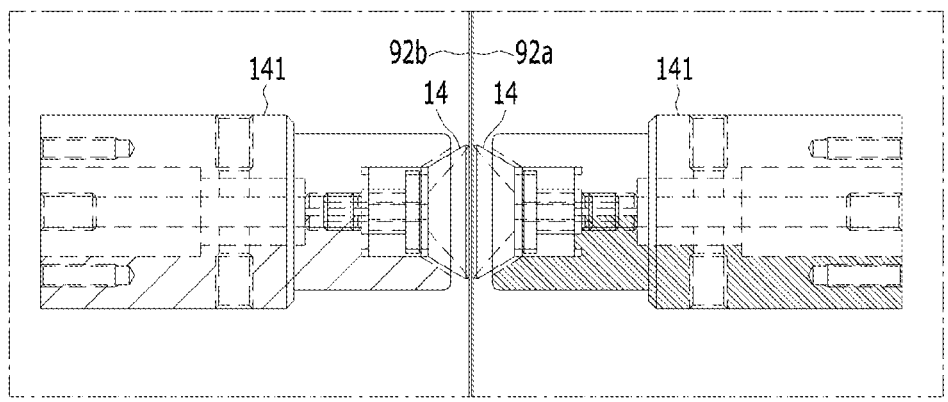
Figure 8:
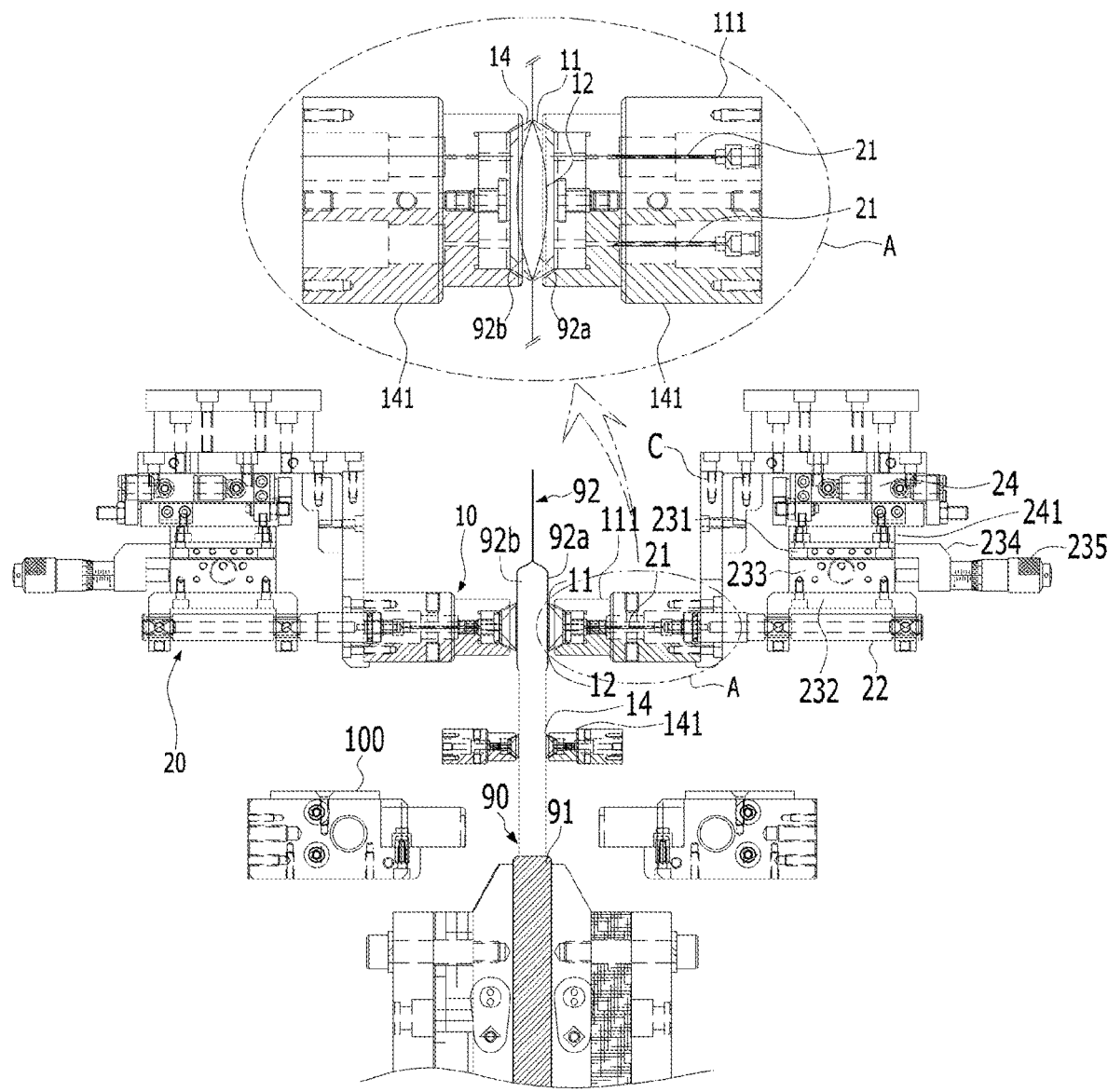

As illustrated in FIGS. 7 and 8, when an adsorption plate 11 is moved forward and backward by the forward and reverse driving unit 13, the adsorption plate 11 adsorbs the first surface 92a and the second surface 92b at the same time and then separates the first surface 92a and the second surface 92b from each other.

Thereafter, (b) both the adsorption plates 11 are respectively pulled to form a space inside of the cell pocket 92.

In detail, the adsorption plate 11 is retracted again by the forward and reverse driving unit 13 and pulls the first surface 92a and the second surface 92b at the same time to form a relatively wider space between the first surface 92a and the second surface 92b.

In this case, the lower adsorption plate 14 is also retracted and pulls the first and second surfaces 92a and 92b, respectively, such that a kind of barrier is formed in the cell pocket 92, and as a result, the electrolyte in a cell body 91 may be prevented from rising to the position in which the needle 21 is inserted into the cell pocket 92.

Figure 9:
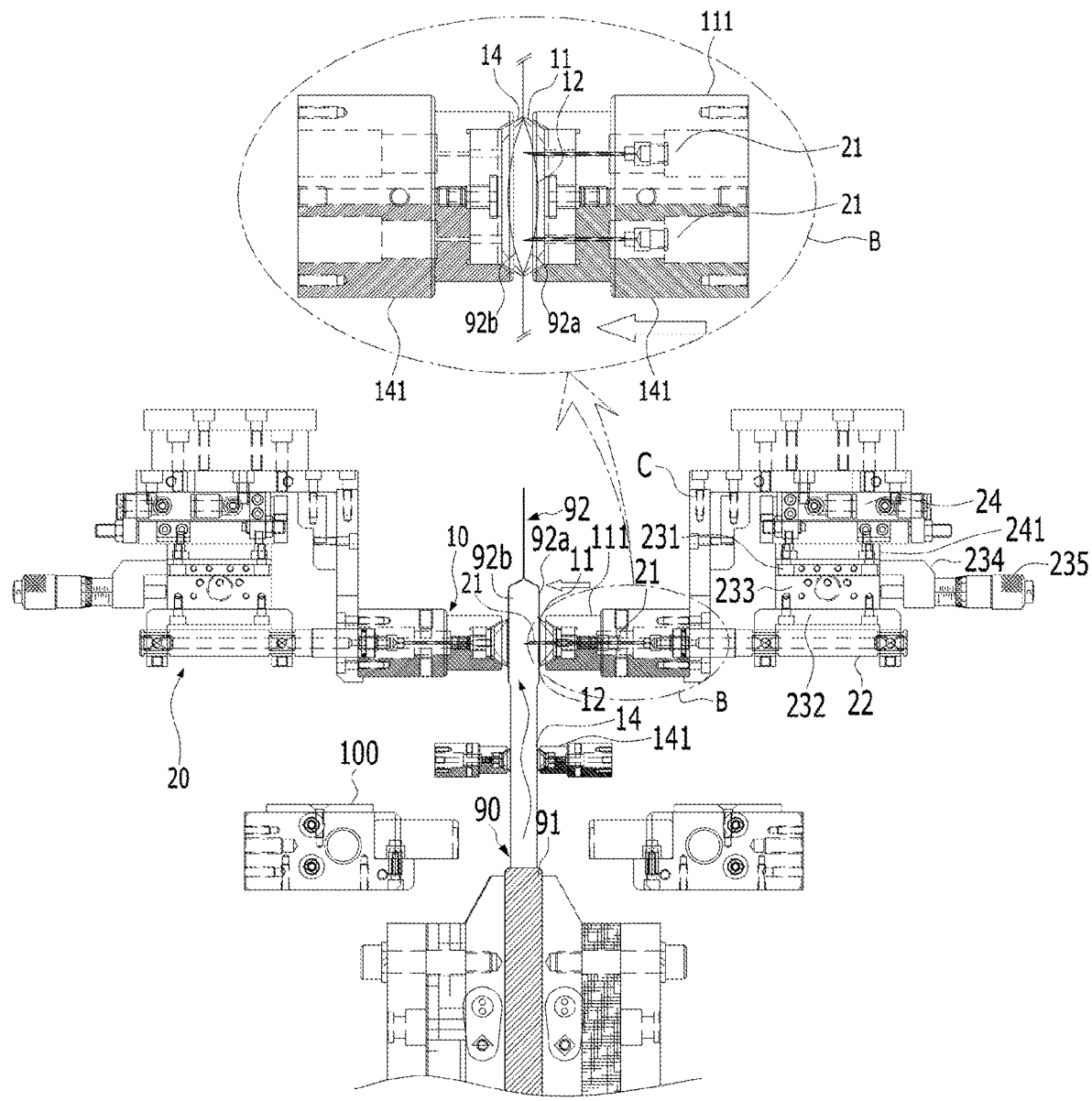

Thereafter, as illustrated in FIG. 9, (c) the first surface 92a and the second surface 92b are punched with the needle 21 and then the gas in the cell pocket 92 is removed.

In detail, the needle 21 is advanced by a needle driving unit 24, to be partially withdrawn from the degassing adsorption plate 12, to penetrate through the first surface 92a and the second surface 92b, respectively, and to be inserted into the inner space of the cell pocket 92.

Simultaneously therewith, the foreign substance removing unit 30 to be described later operates to suck in air.

When the foreign substance removing unit 30 inhales air, the gas inside of the cell pocket 92 is collected in the first trap tank 32 and the second trap tank 35.

Even in the case in which the electrolyte is moved to the insertion hole 111a, the electrolyte is collected by the suction force of the foreign substance removing unit 30.

Figure 10:
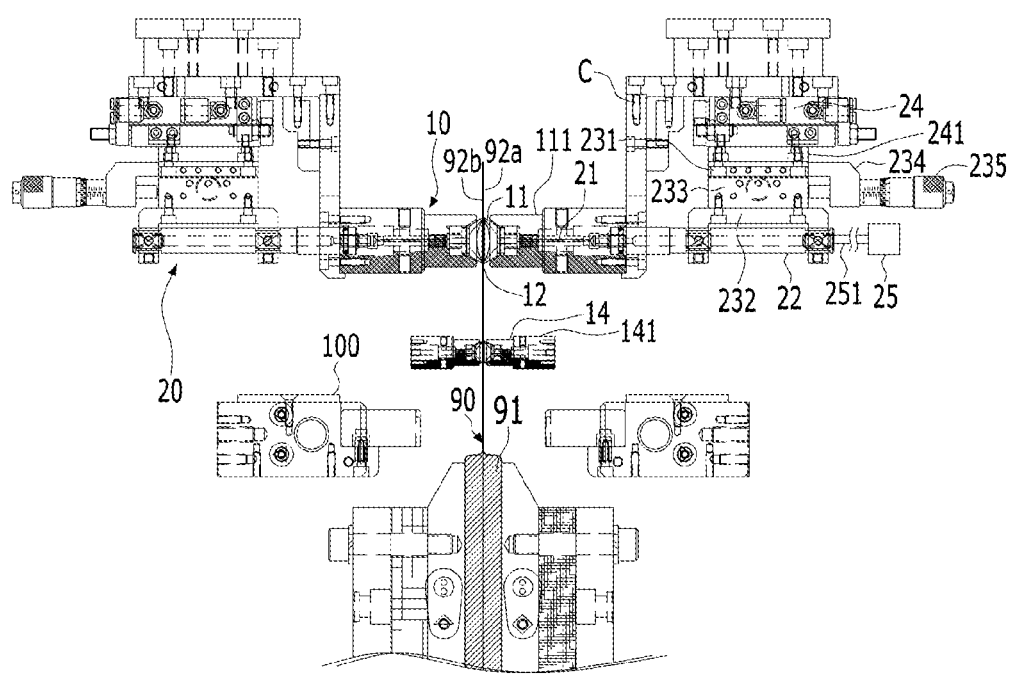
Figure 11:
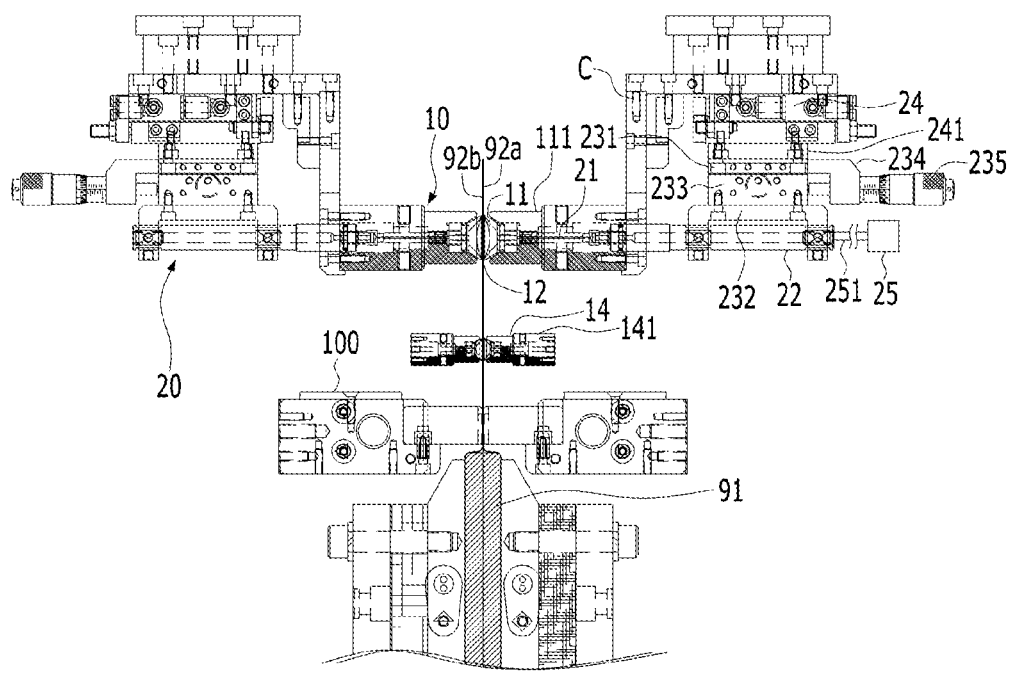
Figure 12:
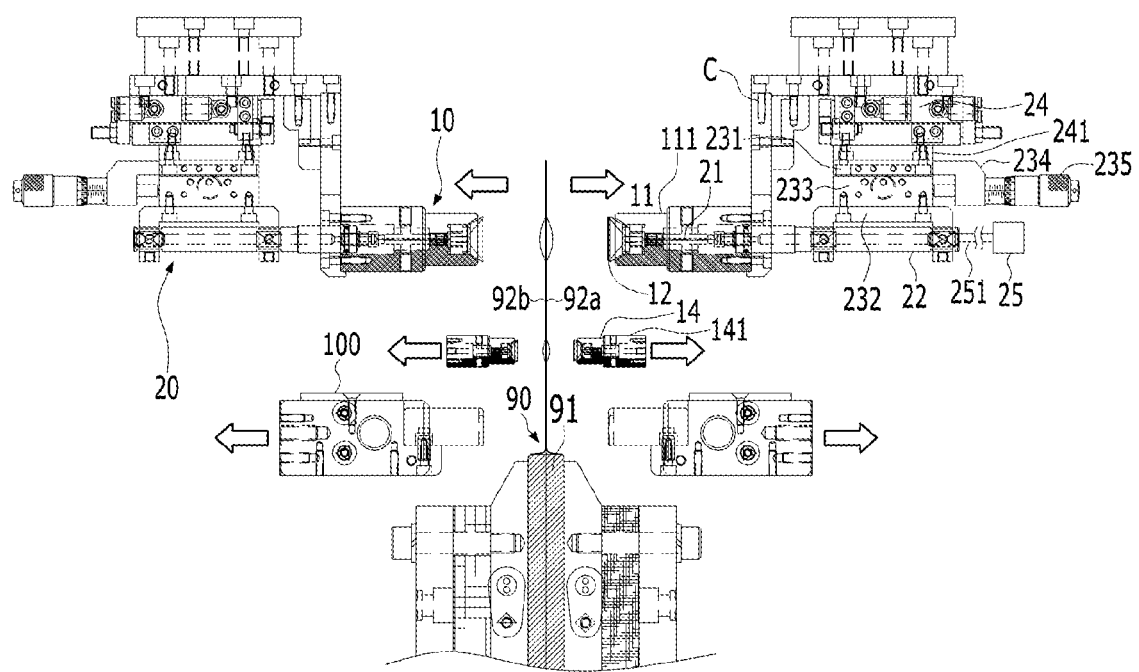

Thereafter, as illustrated in FIG. 10, the forward and reverse driving units 13 advances the adsorption plates 11, respectively, and the driving source advances the lower adsorption plates 14, such that the first surface 92a and the second surface 92b again contact with each other. Then, as illustrated in FIG. 11, a pair of sealing devices 100 located below the lower adsorption plates 14 are moved forward with respect to the first surface 92a and the second surface 92b, to seal the lower portion of the cell pocket 92.

Thereafter, when the preset limit time elapses, the needle driving unit 24 moves the needle 21 backward to be drawn out of the cell pocket 92, and the forward and reverse driving units 13 and the driving source move the adsorption plates 11 and the lower adsorption plates 14 backward to separate the first surface 92a and the second surface 92b from each other.

In addition, the sealing device 100 is also moved backward together with the adsorption plate 11 and the lower adsorption plate 14.

In this case, the amount of gas generated inside of the cell body 91 varies depending on the size of the pouch 90, and the limit time for the needle driving unit 24 to move the needle 21 backward may be changed variously depending on the size of the pouch 90.

As set forth above, according to an exemplary embodiment, there is provided a degassing system of a pouch for a secondary battery in which after suctioning gas regardless of the size of the pouch, the gas may be processed, thereby exhibiting an effect of automatically destroying the vacuum in the suction line for degassing after completing the degassing operation.

In addition, in a degassing system of a pouch for a secondary battery, the convenience of work may be increased by setting the time for degassing or the amount of gas to be discharged according to the size of a pouch, and an abnormality in a suction line for degassing may be automatically detected according to a comparison value by comparing the amount of discharged gas with a reference value preset by each pouch size.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A degassing system of a pouch for a secondary battery, for removing gas from the pouch with a sealed edge, the degassing system comprising:
a separation unit including an adsorption plate for adsorbing at least one surface of the pouch, and a degassing adsorption plate being disposed inside the adsorption plate and adsorbing the pouch inside of the adsorption plate, the degassing adsorption plate including a guide hole through which a needle is configured to be drawn in and out, the separation unit forming a space inside the pouch by pulling the adsorption plate through suction operation of a suction passage;
a gas discharge unit discharging gas inside the pouch through a gas discharge path formed in the needle when the needle pierces the pouch; and
a foreign substance removing unit suctioning a discharge mixed with gas respectively flowing into the suction passage and the gas discharge path, the adsorption plate and the degassing adsorption plate providing adsorption force required for pouch adsorption.

2. The degassing system of claim 1, wherein the foreign substance removing unit includes:
a first suction line connected to the suction passage,
a first suction pump configured to provide adsorption force required for pouch adsorption to the separation unit while suctioning a discharge mixed with gas through the first suction line by a suction operation,
a second suction line connected to the gas discharge path, and
a second suction pump suctioning a discharge mixed with gas through the second suction line by a suction operation.

3. The degassing system of claim 2, further comprising a filter respectively connected to the first suction line and the second suction line, and filtering the discharges mixed with gas.

4. The degassing system of claim 2, further comprising,
a first vacuum pressure sensor sensing pressure in the first suction line,
a solenoid valve connected to the first suction line and configured to open or close the first suction line according to presence or absence of detection of the first vacuum pressure sensor,
a second vacuum pressure sensor sensing pressure in the second suction line, and
a precision control valve connected to the second suction line and configured to open or close the second suction line according to presence or absence of detection of the second vacuum pressure sensor.

5. The degassing system of claim 4, further comprising,
a first kitz valve connected to the solenoid valve by the first suction line, and
a second kitz valve connected to the precision control valve by the second suction line.

6. The degassing system of claim 2, further comprising,
a first pressure control valve adjusting an opening range of the first suction line such that a suction force of the first suction pump acting on the first suction line is changed, depending on a size of the pouch, and
a second pressure control valve adjusting an opening range of the second suction line such that a suction force of the second suction pump acting on the second suction line is changed, depending on the size of the pouch.

7. The degassing system of claim 2, further comprising a first residual pressure removing unit removing residual pressure present in the first suction line after completing the removal of the discharge mixed with gas from the inside of the separation unit,
wherein the first residual pressure removing unit includes,
a first air regulator supplying air to the first connection line.

8. The degassing system of claim 2, further comprising a second residual pressure removing unit removing residual pressure present in the second suction line after completing the removal of the discharge mixed with gas from the gas discharge path,
wherein the second residual pressure removing unit includes,
a second air regulator supplying air to the second connection line.

9. The degassing system of claim 2, further comprising,
a control unit in which a period of degassing time through the second suction line or a gas discharge amount is set according to a size of the pouch, and
a sensor unit transmitting measurement results of an amount of gas discharged from the second suction line to the control unit,
wherein the control unit compares the gas discharge amount measured by the sensor unit with a reference value predefined for each size of the pouch, and detects an abnormality in the second suction line according to a comparison value.

* * * * *